(12) United States Patent
Nakamura

(10) Patent No.: US 11,084,193 B2
(45) Date of Patent: Aug. 10, 2021

(54) MANUFACTURING METHOD OF MOLDED ARTICLE INCLUDING ANNULAR RESIN MEMBER

(71) Applicant: NAKANISHI METAL WORKS CO., LTD., Osaka (JP)

(72) Inventor: Masayoshi Nakamura, Osaka (JP)

(73) Assignee: NAKANISHI METAL WORKS CO., LTD., Osaka (JP)

( * ) Notice: Subject to any disclaimer, the term of this patent is extended or adjusted under 35 U.S.C. 154(b) by 0 days.

(21) Appl. No.: 17/062,322

(22) Filed: Oct. 2, 2020

(65) Prior Publication Data
US 2021/0114267 A1    Apr. 22, 2021

(30) Foreign Application Priority Data
Oct. 21, 2019   (JP) ............................ JP2019-191875

(51) Int. Cl.
*B29C 45/14*   (2006.01)
*B29C 45/16*   (2006.01)
*B29L 15/00*   (2006.01)

(52) U.S. Cl.
CPC .... *B29C 45/1459* (2013.01); *B29C 45/14065* (2013.01); *B29C 45/1615* (2013.01); *B29C 2045/14131* (2013.01); *B29L 2015/003* (2013.01)

(58) Field of Classification Search
None
See application file for complete search history.

(56) References Cited

U.S. PATENT DOCUMENTS

2008/0146402 A1* 6/2008 Shinohara ............... F16H 55/06
475/331
2017/0001351 A1* 1/2017 Nakamura .......... B29C 45/1615

FOREIGN PATENT DOCUMENTS

JP         5008197      *  8/2012
JP       2017013417 A     1/2017
JP       2017196766 A    11/2017

* cited by examiner

*Primary Examiner* — Edmund H Lee
(74) *Attorney, Agent, or Firm* — Innovation Capital Law Group, LLP; Vic Lin

(57) ABSTRACT

In the primary molding step, the insert core having axially-projecting convex portions aligned apart from one another in the circumferential direction is located in a primary molding die, and the injection molding is performed. In the secondary molding step, the annular internal resin member and the insert core which have undergone the primary molding step are located in a secondary molding die, and the injection molding is performed. Gates for injecting molten resin in a cavity of the secondary molding die are located in the secondary molding die so that welds that are joining points of the molten resin in the secondary molding step are positioned in the radially outside of rib portions.

6 Claims, 18 Drawing Sheets

MANUFACTURING METHOD OF MOLDED ARTICLE INCLUDING ANNULAR RESIN MEMBER

FIELD OF THE INVENTION

The present invention relates to a manufacturing method of a molded article including an annular resin member. The method includes a primary molding step and a secondary molding step.

BACKGROUND OF THE INVENTION

A molded article that includes an annular resin member and is manufactured through a primary molding step and a secondary molding step may include: an annular internal resin member having a plurality of axially thinned portions that are formed through the primary molding step to be apart from one another in the circumferential direction; and an annular external resin member that is formed through the secondary molding step to cover the outer periphery of the annular internal resin member, and is made of a material different from that of the annular internal resin member (See Patent Literature 1, for example).

In the secondary molding step during the manufacturing of such an annular-shaped molded article, injection molding is performed with axially-projecting convex portions (projecting portions 7B of an insert core 7 in Patent Literature 1) of an insert core being fitted into the axially thinned portions (thinned portions D in Patent Literature 1) of the annular internal resin member (annular internal member 4 in Patent Literature 1).

Meanwhile, in some manufacturing method of an annular molded article, which includes a primary molding step and a secondary molding step, a pin gate, a tunnel gate, or a side gate is used as a gate of a die used in the primary molding step and the secondary molding step. In this method, gate positions and weld positions, which are known as particular points at which the strength of a molded article is deteriorated, are prevented from overlapping each other in the radial direction, and the weld positions are also prevented from overlapping each other in the radial direction (See Patent Literature 2, for example).

CITATION LIST

Patent Literature

Patent Literature 1: JP 2017-196766 A
Patent Literature 2: JP 2017-013417 A

SUMMARY OF THE INVENTION

Technical Problem

In an annular internal resin member, which is the molded article obtained through the primary molding step and has a plurality of axially thinned portions spaced from one another in the circumferential direction, the secondary molding step may be performed without fitting axially-projecting convex portions of an insert core into the axially thinned portions of the annular internal resin member for allowing the axially thinned portions to be in the opened state. In this situation, deformation or a crack may occur on the periphery of each of the axially thinned portions due to the pressure by a secondary-molding molten resin that is injected from a gate into a cavity of a secondary molding die used during the secondary molding step.

In view of the above, consideration is given to a manufacturing method in which the annular internal resin member as a molded article formed through the primary molding step has a plurality of axially thinned portions that are apart from one another in the circumferential direction, as in Patent Literature 1, and a secondary molded article formed in the secondary molding step is formed by molding with the axially-projecting convex portions of the insert core being fitted into the axially thinned portions of the annular internal resin member.

If the gate of the die used in the secondary molding step is a pin gate, a tunnel gate, or a side gate, as in Patent Literature 2, a weld that is a joining point of the molten resin may be positioned in the radially outside of the axially thinned portions (axially-projecting convex portions of the insert core).

Pressure larger than that applied to other portions is applied to the weld during pressure keeping after the molten resin is injected. The pressure causes the annular internal resin member that is the primary molded article to be pressed toward the radially inside from the radially outside. Accordingly, the pressing force also acts on the axially-projecting convex portions of the insert core. The axially-projecting convex portions of the insert core have a cantilever shape, and thus a large shearing force and bending moment act on the proximal part of each of the axially-projecting convex portions. The large pressure applied to the weld during the pressure keeping may cause the axially-projecting convex portions to be broken or fractured, if the thickness, in the radial direction, of the axially-projecting convex portion of the insert core is small relative to the height thereof in the axial direction.

The present invention has been made in view of the aforementioned situation, and an object of the present invention is to improve the life of a die by preventing the breakage or fracture of the insert core, in a manufacturing method of an annular resin member through the primary molding step and the secondary molding step. In the method, the annular resin member has a plurality of axially thinned portions formed through the primary molding step.

The secondary molding step is performed with axially-projecting convex portions of the insert core being fitted with the axially thinned portions.

Solution to Problem

The present invention is substantially described as follows.

[1] A manufacturing method of a molded article including an annular resin member,
the molded article including:
  an annular internal resin member formed by molding in a primary molding step using a primary molding die to have a plurality of axially thinned portions that are to be apart from one another in a circumferential direction; and
  an annular external resin member formed by molding in a secondary molding step using a secondary molding die, the annular external resin member covering an outer periphery of the annular internal resin member and being made of a material different from a material of the annular internal resin member,
the manufacturing method including:

using one of a pin gate, a tunnel gate, and a side gate for a gate used for injecting a primary-molding molten resin in a cavity of the primary molding die and a gate used for injecting a secondary-molding molten resin in a cavity of the secondary molding die;

in the primary molding step,
using an insert core having a plurality of axially-projecting convex portions aligned apart from one another in the circumferential direction for forming the axially thinned portions in the annular internal resin member, and
locating the insert core in the primary molding die, and performing injection molding, in the secondary molding step,
performing injection molding by one of:
(i) locating the annular internal resin member and the insert core which have undergone the primary molding step in the secondary molding die; and
(ii) removing the insert core from the annular internal resin member and the insert core which have undergone the primary molding step to allow only the annular internal resin member to remain,
using the secondary molding die having axially-projecting convex portions to be fitted in the axially thinned portions of the annular internal resin member, and
locating the annular internal resin member in the secondary molding die so that the axially thinned portions of the annular internal resin member are fitted in the axially-projecting convex portions of the secondary molding die; and
locating, in the secondary molding die, the gate used for injecting the secondary-molding molten resin in the cavity of the secondary molding die so that a weld that is a joining point of the secondary-molding molten resin in the secondary molding step is positioned in radially outside of a rib portion between the axially thinned portions adjacent to each other.

[2] A manufacturing method of a molded article including an annular resin member,
the molded article including:
a metallic member that is an insert article;
an annular internal resin member formed by molding in a primary molding step using a primary molding die to have a plurality of axially thinned portions that are apart from one another in a circumferential direction, the annular internal resin member covering an outer periphery of the metallic member; and
an annular external resin member formed by molding in a secondary molding step using a secondary molding die, the annular external resin member covering an outer periphery of the annular internal resin member and being made of a material different from a material of the annular internal resin member,
the manufacturing method including:
using one of a pin gate, a tunnel gate, and a side gate for a gate used for injecting a primary-molding molten resin in a cavity of the primary molding die and a gate used for injecting the secondary-molding molten resin in a cavity of the secondary molding die;
in the primary molding step,
using an insert core having a plurality of axially-projecting convex portions that are apart from one another in a circumferential direction for forming the axially thinned portions in the annular internal resin member, and
locating, in the primary molding die, a coupled body in which the insert core is fitted in the metallic member, and performing injection molding, in the secondary molding step,
performing injection molding by one of:
(i) locating the coupled body and the annular internal resin member which have undergone the primary molding step in the secondary molding die; and
(ii) removing the insert core from the coupled body and the annular internal resin member which have undergone the primary molding step to allow only the metallic member and the annular internal resin member to remain,
using the secondary molding die having axially-projecting convex portions to be fitted in the axially thinned portions of the annular internal resin member, and
locating the metallic member and the annular internal resin member in the secondary molding die so that the axially thinned portions of the annular internal resin member are fitted in the axially-projecting convex portions of the secondary molding die; and
locating the gate used for injecting the secondary-molding molten resin in the cavity of the secondary molding die in the secondary molding die so that a weld that is a joining point of the secondary-molding molten resin in the secondary molding step is positioned in radially outside of a rib portion between the axially thinned portions adjacent to each other.

[3] In the manufacturing method of a molded article including an annular resin member, according to the above [1] or [2],
the gate used for injecting the primary-molding molten resin is located in the primary molding die so that the weld that is a joining point of the primary-molding molten resin in the primary molding step is positioned between the axially thinned portions adjacent to each other.

[4] In the manufacturing method of a molded article including an annular resin member, according to any one of the above [1] to [3],
the number of the gate in the primary molding step and the number of the gate in the secondary molding step are set to be plural and identical, and the gates used in the primary molding step and the gates used in the secondary molding step are arranged in the circumferential direction, and
each of the gates in the secondary molding step is positioned in a circumferentially middle, or in vicinity thereof, of a gate mark in the annular internal resin member formed by molding in the primary molding step and a weld line adjacent to the gate mark.

According to the manufacturing method of a molded article including an annular resin member, effects described below can be mainly obtained.

The gate for injecting the secondary-molding molten resin into the cavity of the secondary molding die is located in the secondary molding die so that the welds that are the joining portions of the secondary-molding molten resin in the secondary molding step are positioned in the radially outside of the rib portions each of which is located between the axially thinned portions adjacent to each other. With this configuration, the welds to which pressure larger than that applied to other portions is applied during the pressure keeping after the filling of the molten resin are not positioned in the radially outside of the axially-projecting convex portions of the insert core. Accordingly, the shearing force and the bending moment which act on the axially-projecting convex portions having a cantilevered shape can be reduced, thereby inhibiting the breakage or fracture of the axially-projecting convex portions. Accordingly, the life of the die can be improved.

DESCRIPTION OF EMBODIMENTS

An embodiment of the present invention is described in detail with reference to the accompanying drawings.

The direction of a rotation axis of a resin gear with metallic core 1 or the direction parallel to the rotation axis refers to an "axial direction", and a "radial direction" and a "circumferential direction" are defined with respect to an axial core of the rotation axis.

<Molded Article Including Annular Resin Member>

Figure 1A:
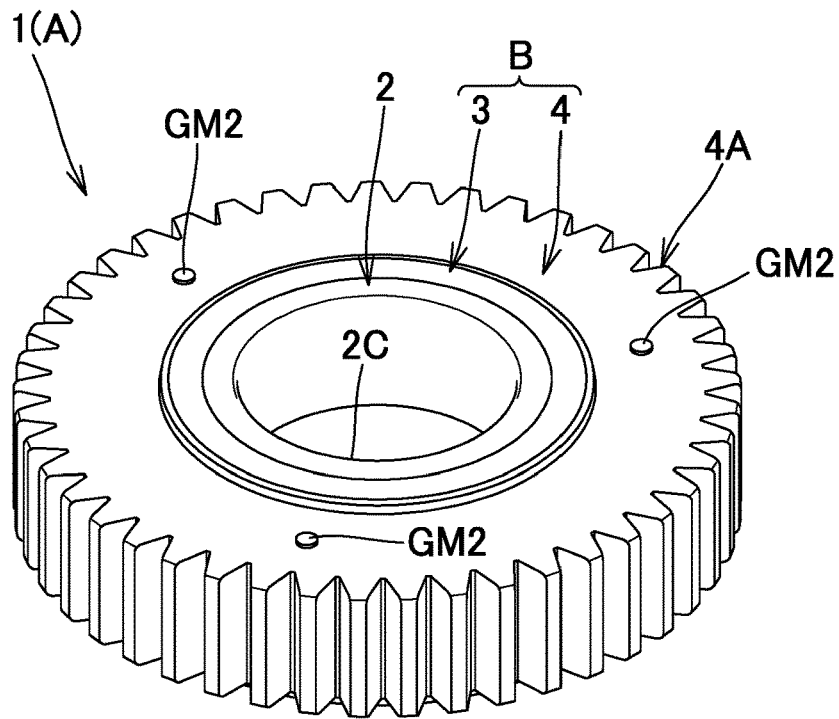
FIG. 1A is a perspective view of a resin gear with metallic core (in the case where the metallic core is an annular sleeve) prepared by forming teeth through machining operation at the outer peripheral surface of a molded article manufactured by a manufacturing method of the molded article including an annular resin member, according to an embodiment of the present invention.
Figure 1B:
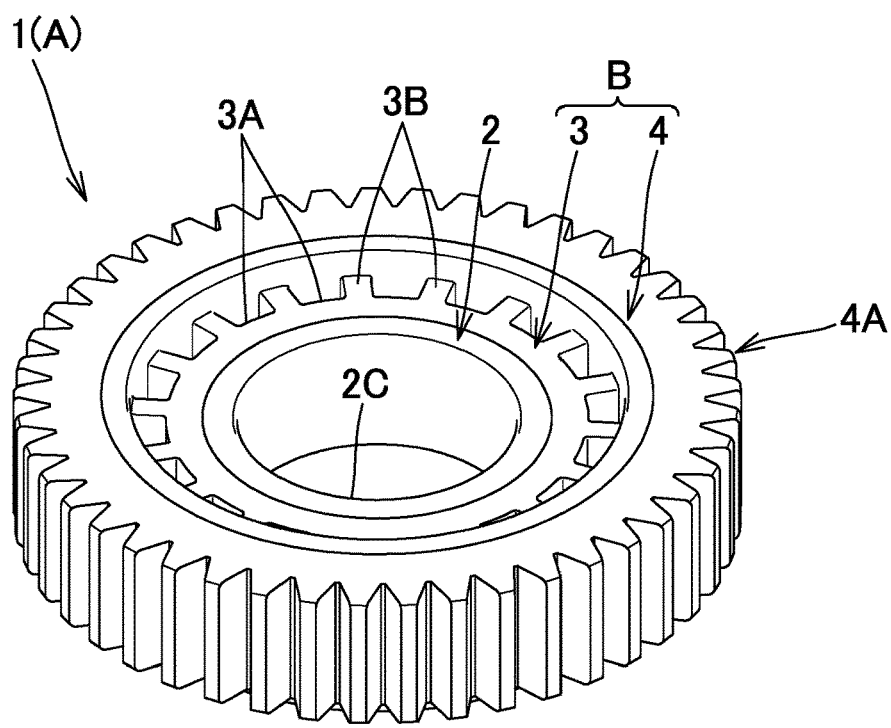
FIG. 1B is a perspective view viewed from the underneath of the resin gear with metallic core shown in FIG. 1A.
Figure 2A:
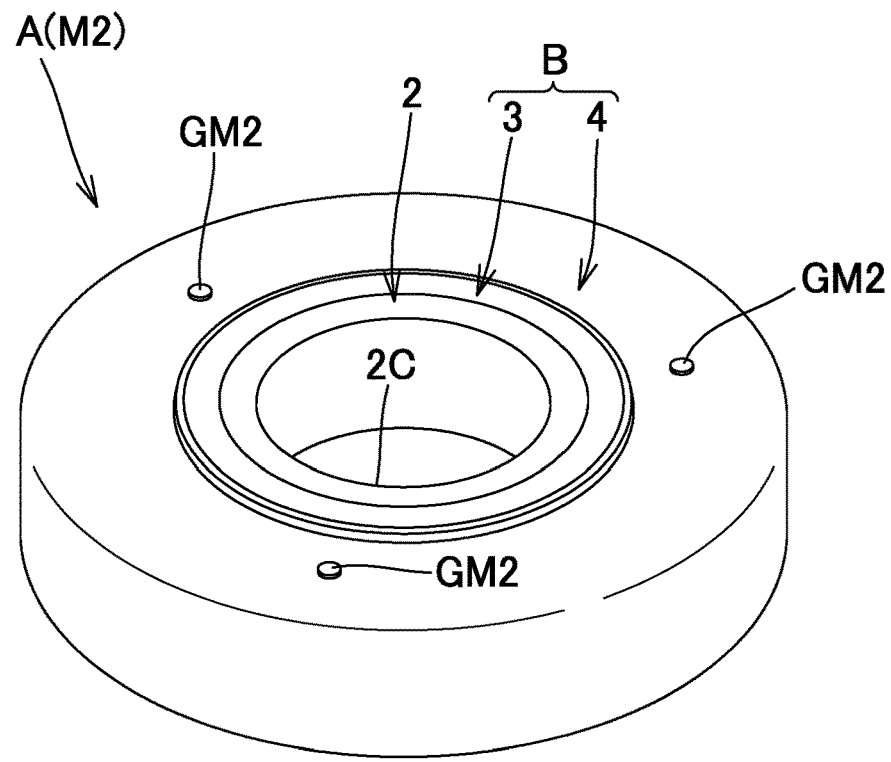
FIG. 2A is a perspective view of the molded article (the resin gear with metallic core before formation of teeth to engage with another gear on its outer peripheral surface) manufactured by the manufacturing method of the molded article including the annular resin member, according to the embodiment of the present invention.
Figure 2B:
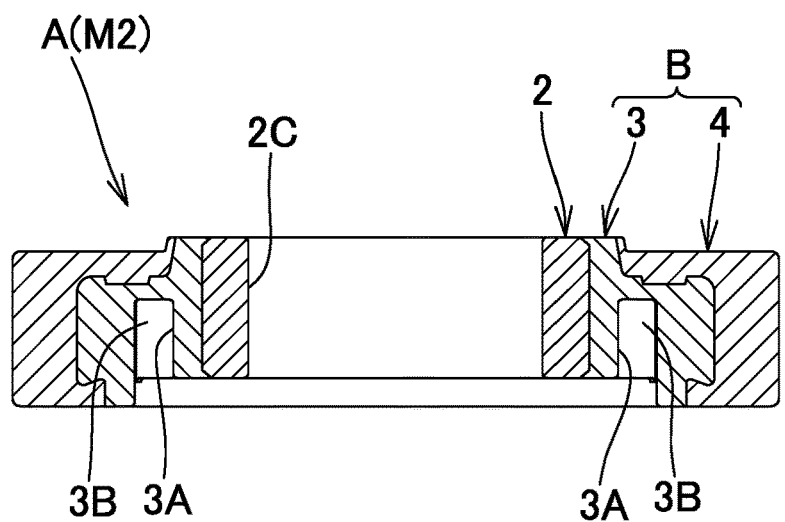
FIG. 2B is a vertical cross-sectional view of the molded article.

The resin gear with metallic core 1 illustrated in the perspective views of FIGS. 1A and 1B is prepared in the following manner. A molded article A shown in the perspective view of FIG. 2A and the vertical cross-sectional view of FIG. 2B is manufactured through the manufacturing method of a molded article including an annular resin member according to the present embodiment. The molded article A includes an annular resin member B (annular external resin member 4), the outer peripheral surface of which is provided with teeth 4A to engage with another gear, through machining operation. The resin gear with metallic core 1 is used as a worm wheel of a worm gear for use in electric power steering, for example.

The resin gear with metallic core 1 (the molded article A including the annular resin member B) includes the annular resin member B and a metallic core 2 that is a metallic member and an annular sleeve. The annular resin member B includes an annular internal resin member 3 that covers the outer periphery of the metallic core 2, and an annular external resin member 4 that covers the outer periphery of the annular internal resin member 3.

The annular internal resin member 3 is made of, for example, a synthetic resin reinforced with a reinforcing material such as glass fiber, the annular external resin member 4 is made of, for example, a synthetic resin without being reinforced with the reinforcing material, and the annular internal resin member 3 and the annular external resin member 4 are made of materials different from each other. The aforementioned "materials different from each other" includes a case where the same polymer is used for the materials and the contents of the reinforcing materials are different, in addition to a case where the polymers used for the materials are different from each other.

As shown in the perspective view of FIG. 1B and the vertical cross sectional view of FIG. 2B, the resin gear with metallic core 1 (the molded article A including the annular resin member B) includes a plurality of axially thinned portions 3A that are separated from one another in the circumferential direction on the annular internal resin member 3. Rib portions 3B are each provided between the axially thinned portions 3A adjacent to each other in the circumferential direction.

Such a resin gear with metallic core 1 (the molded article A including the annular resin member B) has the annular resin member B made of the synthetic resin, and a plurality of axially thinned portions 3A. Accordingly, the weight of the entire resin gear with metallic core 1 is significantly reduced in comparison with those that are entirely made of metal. Furthermore, the resin gear with metallic core 1 is provided with a plurality of axially thinned portions 3A, so that the volume of the annular internal resin member 3 is reduced to bring about a shorter hardening time. As a result, it is possible to shorten the molding cycle and to decrease the amount of shrinkage, thereby inhibiting sink marks, voids, and others.

<Manufacturing Method of Molded Article Including Annular Resin Member>

The manufacturing method of the molded article A including the annular resin member B, according to the embodiment of the present invention, is described.

In the manufacturing method of the molded article A, a dedicated two-color molding machine is not used, but two general molding machines including a first injection molding machine having a primary molding die and a second injection molding machine having a secondary molding die, are used.

<Coupled Body in which Insert Core is Fitted into Metallic Member>

Figure 3A:
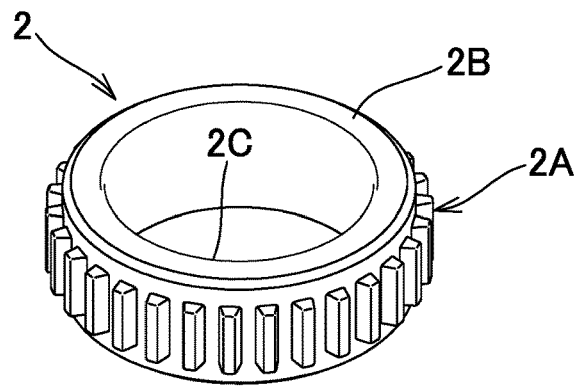
FIG. 3A is a perspective view of the metallic core that is an annular sleeve.

As shown in the perspective view of FIG. 3A, the metallic core 2 that is a metal member and an annular sleeve has teeth-shaped projections 2A (concaves and convexes) on the outer peripheral surface of a base body 2B, and an internal hole 2C as a fitting concave portion.

Figure 3B:
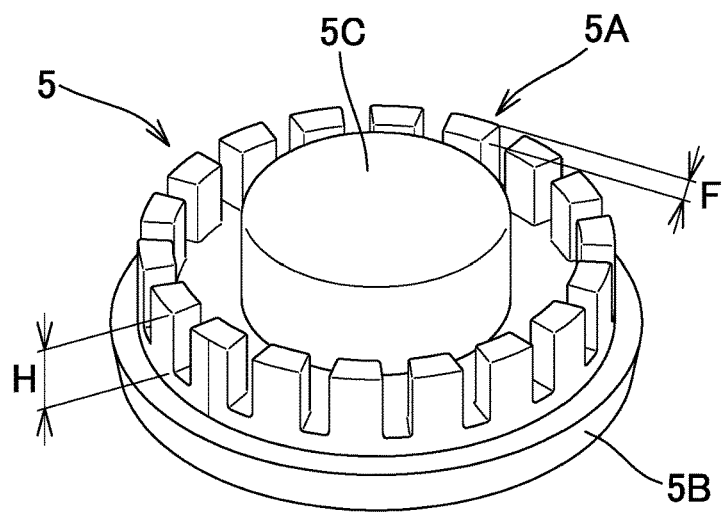
FIG. 3B is a perspective view of an insert core.

As illustrated in the perspective view of FIG. 3B, an insert core 5 has a disc-shaped base body 5B, axially-projecting convex portions 5A aligned in the radially outer area of the surface of the base body 5B in the circumferential direction so as to project in the axial direction, and a round shaft 5C at a radially central part of the base body 5B, as a fitting convex portion to fit into the internal hole 2C of the metallic core 2.

Figure 3C:
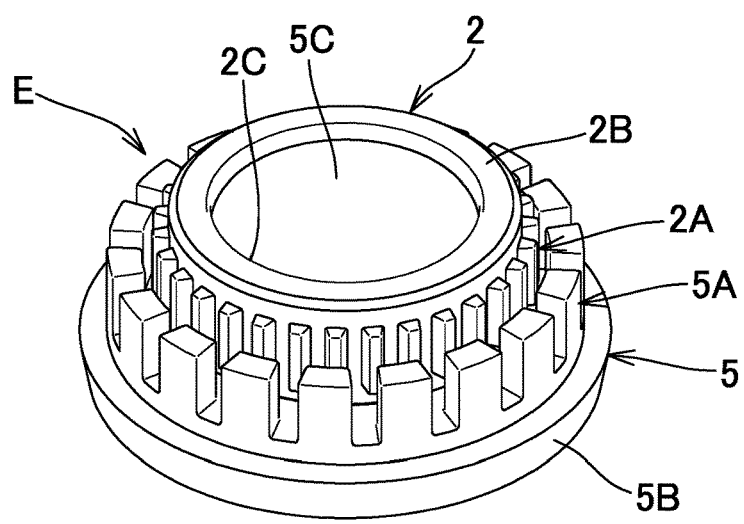
FIG. 3C is a perspective view of a coupled body in which the insert core is fitted into the metallic core.

The round shaft 5C of the insert core 5 is inserted and fitted into the internal hole 2C of the metallic core 2, to thereby obtain a coupled body E in which the insert core 5 is fitted into the metallic core 2 that is the metal member, as illustrated in the perspective view of FIG. 3C.

<Insert Core Used in Common in Primary Molding Step and Secondary Molding Step>

The insert core 5 is used in common in the primary molding step using the primary molding die and in the secondary molding step using the secondary molding die.

Figure 4A:
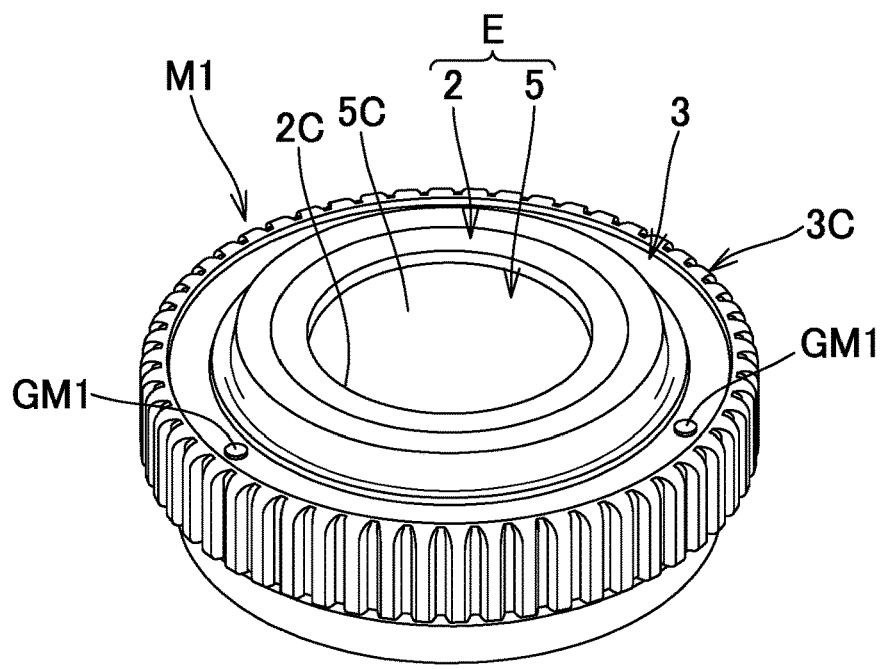
FIG. 4A is a perspective view of a primary molded article that is manufactured through a primary molding step, and is then removed together with the insert core from a primary molding die.
Figure 4B:
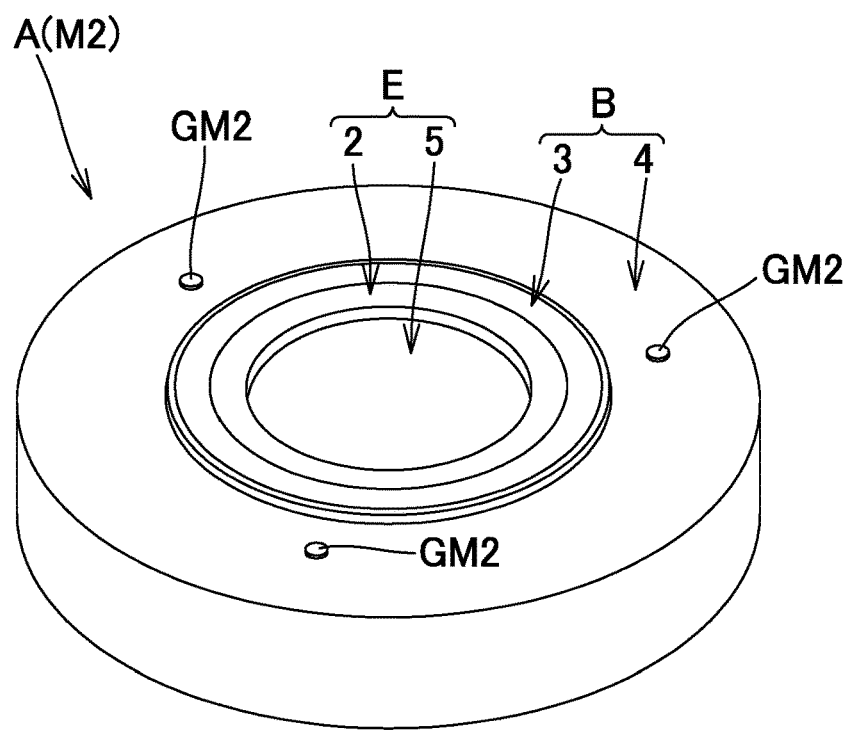
FIG. 4B is a perspective view of a secondary molded article that is manufactured through a secondary molding step, and is then removed together with the insert core from a secondary molding die.

In other words, when being removed from the primary molding die as illustrated in the perspective view of FIG. 4A, the insert core 5 is coupled to a primary molded article M1, and when being removed from the secondary molding die as illustrated in the perspective view of FIG. 4B, the insert core 5 is coupled to a secondary molded article M2.

<Primary Molded Article and Secondary Molded Article>

In the primary molded article M1 illustrated in the perspective view of FIG. 4A, the annular internal resin member 3 includes, on its outer peripheral surface, teeth-shaped projections (concaves and convexes) 3C. The primary molded article M1 has at one of the axial end surfaces, gate marks GM1 provided during the primary molding step. As illustrated in the perspective view of FIG. 4B, the secondary molded article M2 has at one of the axial end surfaces, gate marks GM2 provided during the secondary molding step.

<Coupling Step>

Figure 5A:
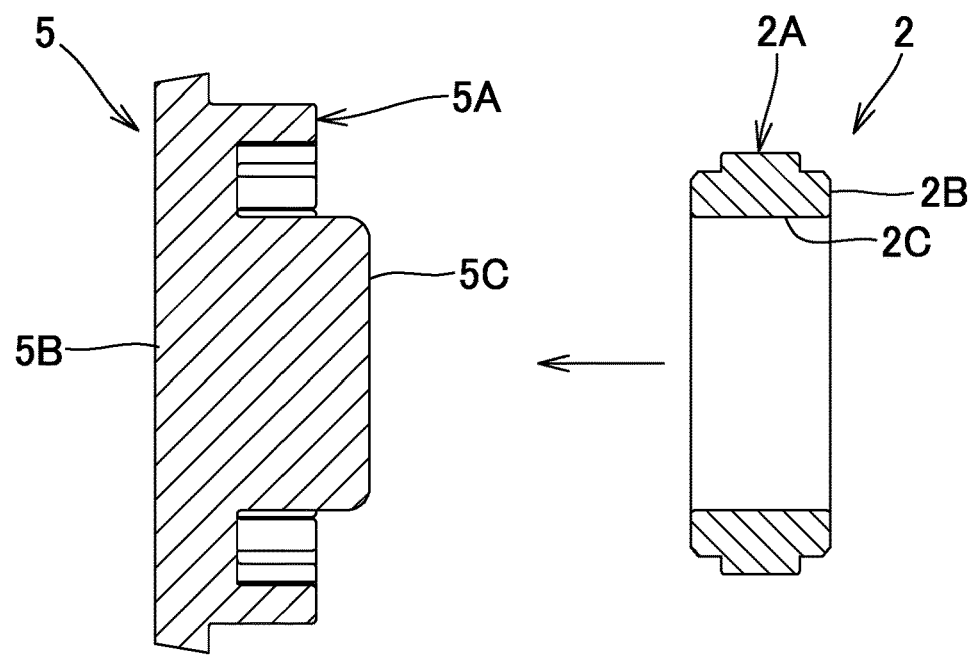
FIG. 5A is a vertical cross-sectional view of the metallic core and the insert core in the separated state.
Figure 5B:
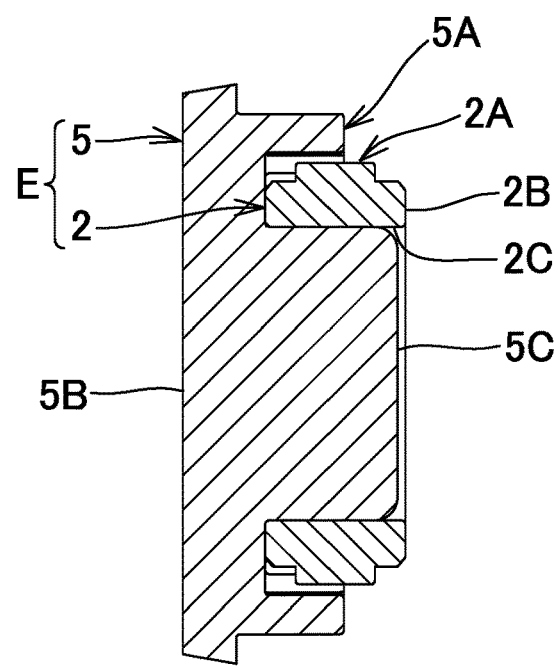
FIG. 5B is a vertical cross-sectional view of the coupled body in which the insert core is fitted into the metallic core.

As illustrated in the perspective views of FIGS. 3A and 3B and the vertical cross-sectional view of FIG. 5A, the metallic core 2 and the insert core 5 that are separated from each other are fitted together by inserting the round shaft 5C into the internal hole 2C to form the coupled body E illustrated in the perspective view of FIG. 3C and the vertical cross-sectional view of FIG. 5B.

<Primary Molding Step>

Figure 6A:
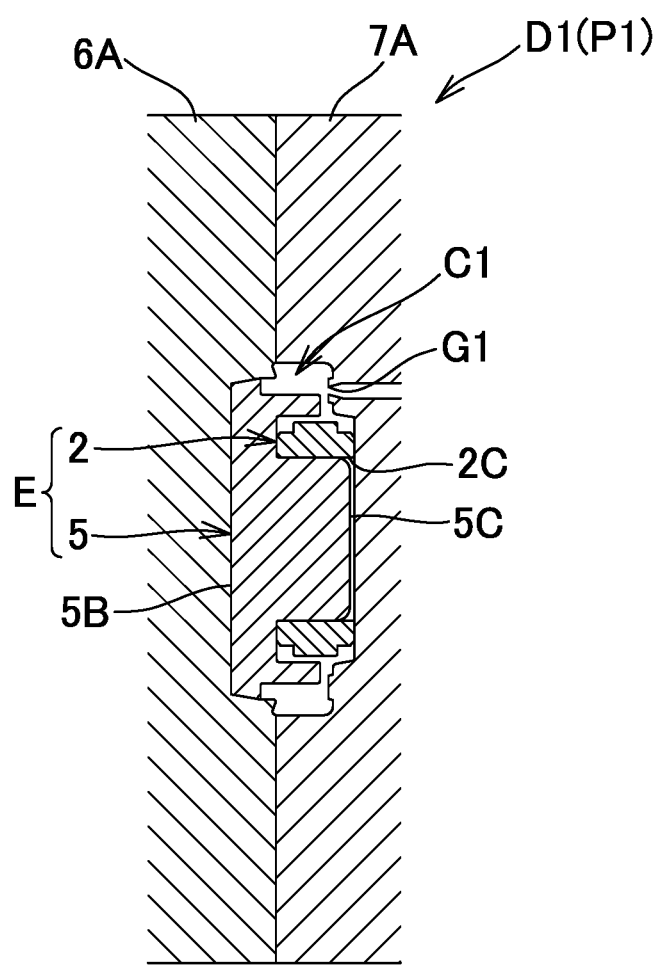
FIGS. 6A to 6C are vertical cross-sectional views, and respectively show: a state in which the coupled body illustrated in FIG. 5B is set in the primary molding die and the primary molding die is closed; a state in which a primary-molding molten resin is injected into the primary molding die; and the primary molded article and the insert core removed from the opened primary molding die.
Figure 6B:
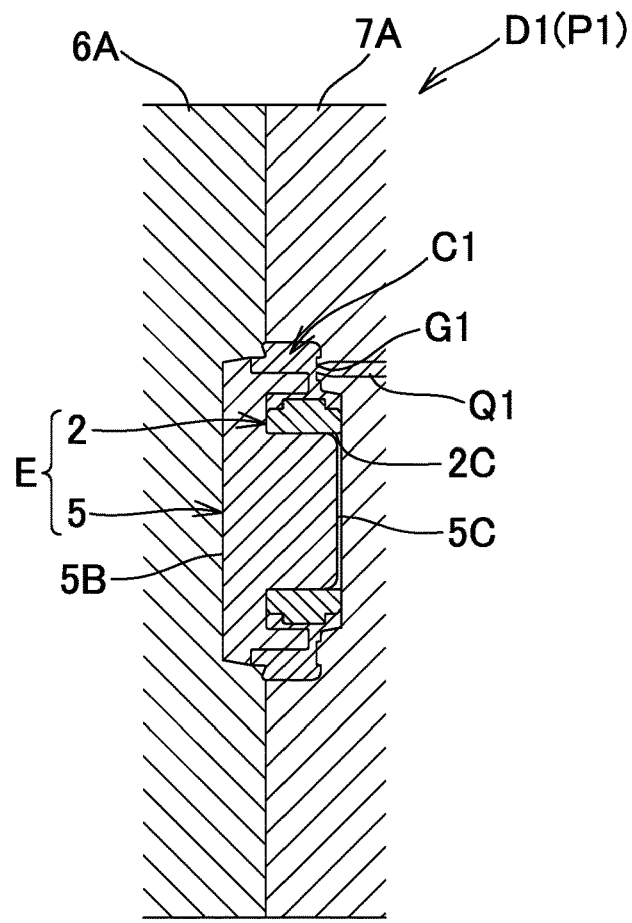

As illustrated in the vertical cross-sectional views of FIGS. 6A and 6B, a primary molding die D1 includes a movable die 6A and a fixed die 7A, which are used in a primary molding step P1.

As illustrated in FIG. 6A, the base body 5B of the insert core 5 is positioned in the movable die 6A of the primary molding die D1 so as to set the coupled body E in the primary molding die D1, and the primary molding die D1 is closed with the metallic core 2 that is an insert article being positioned.

Then, as illustrated in FIG. 6B, a primary-molding molten resin Q1 is injected from a gate G1 into a cavity C1 of the primary molding die D1 to form the annular internal resin member 3 by injection molding. The gate G1 is a pin gate, a tunnel gate, or a side gate.

In the case where the gate G1 is a pin gate or others mentioned above, wasted material is reduced to thereby decrease-material cost, in comparison with a case where the gate G1 is a film gate or a disc gate. Furthermore, if the gate is the pin gate or the tunnel gate, the gate is automatically cut at the time when the die is opened. Accordingly, the gate cut is not required after the molded article is taken out, unlike a case where the gate is the film gate or the disc gate.

<Gate Position in Primary Molding Step>

Figure 9A:
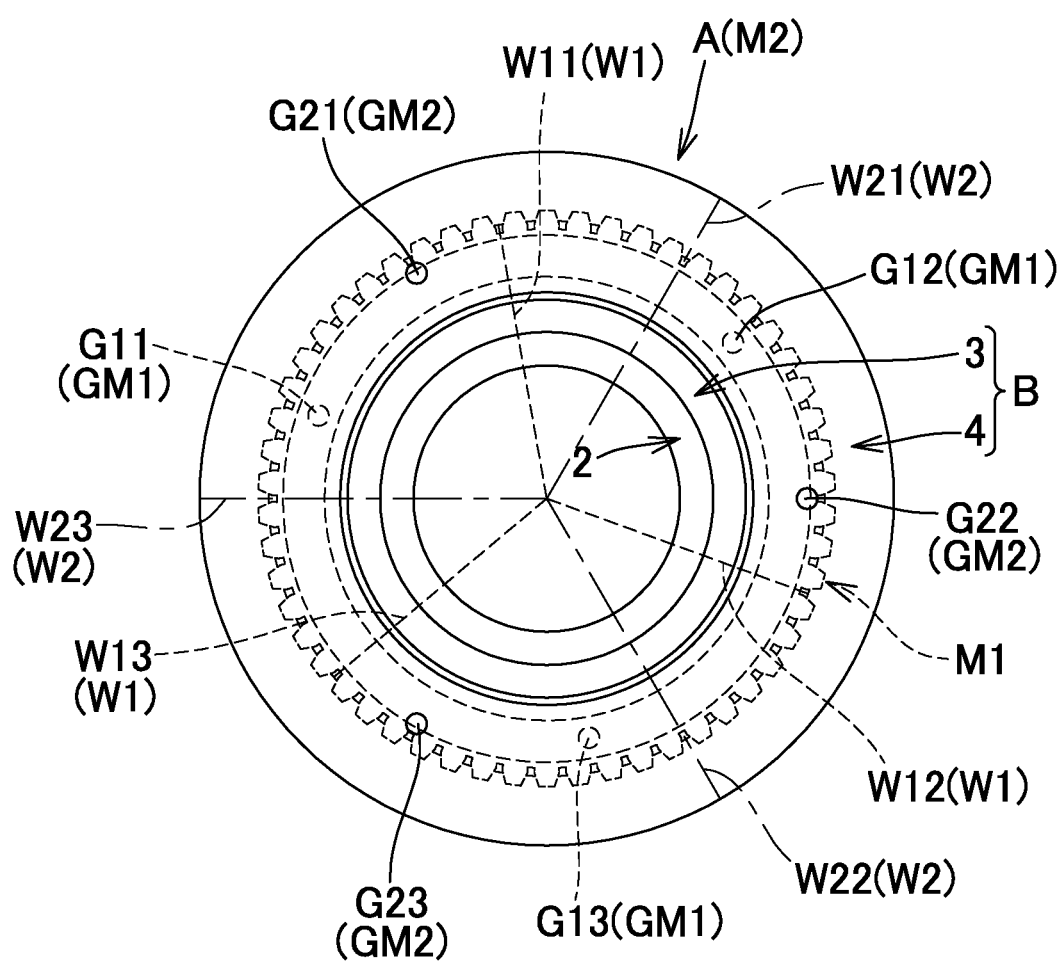
FIG. 9A is a plan view of the molded article manufactured by the manufacturing method of the molded article including the annular resin member according to the embodiment of the present invention, which shows gate positions and weld positions in the primary molding step and gate positions and weld positions in the secondary molding step.
Figure 9B:
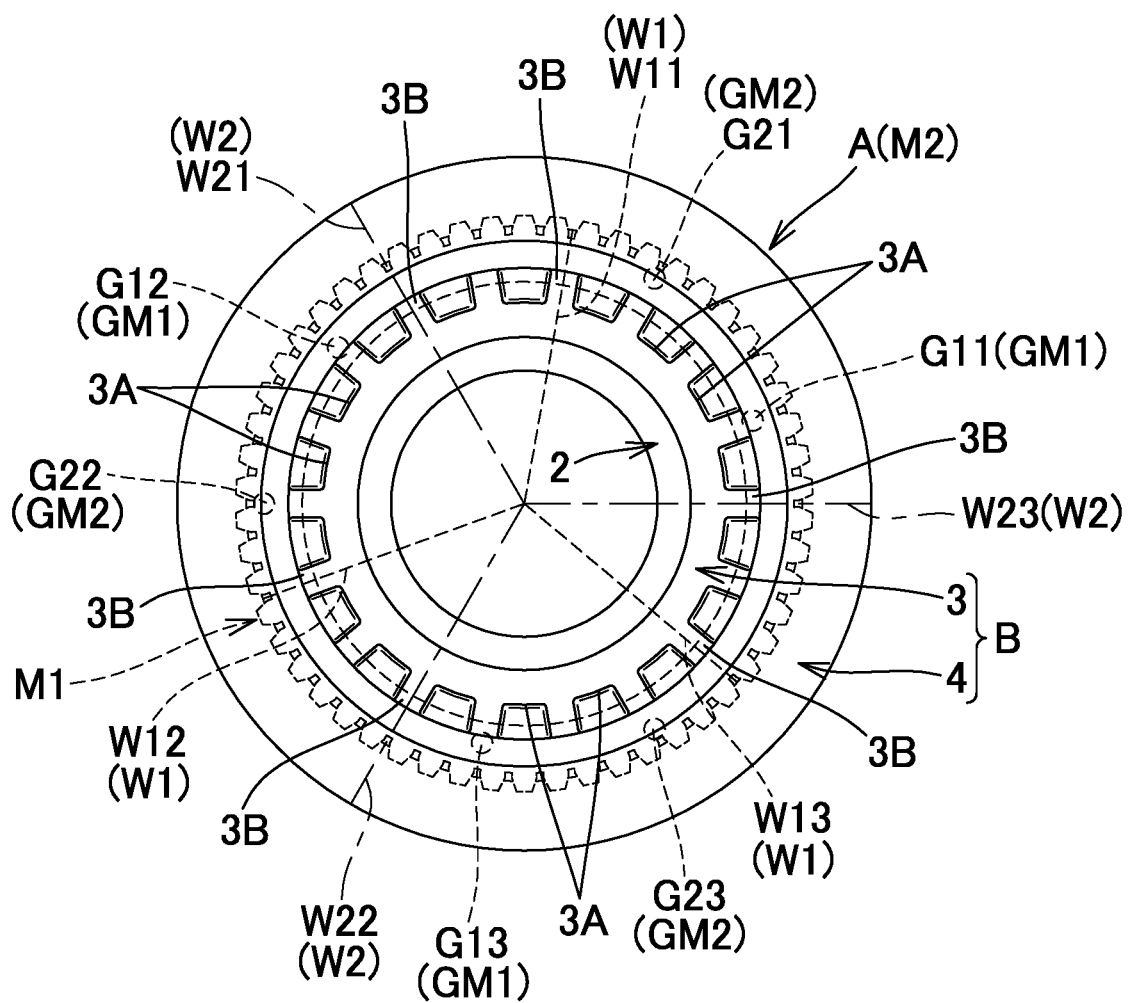
FIG. 9B is a bottom view of the molded article manufactured by the manufacturing method of the molded article including the annular resin member according to the embodiment of the present invention, which shows the gate positions and the weld positions in the primary molding step and the gate positions and the weld positions in the secondary molding step.

In the plan view of FIG. 9A and the bottom view of FIG. 9B, positions of the gates G1 (gate marks GM 1) used during the primary molding step P1, and positions of welds W1 at which the primary-molding molten resin Q1 is joined are illustrated. Three gates G1 are used in the present embodiment. The positions of the gates G1 (gate marks GM 1) are indicated by G11, G12, and G13. The weld lines which are the positions of the welds W1 are indicated by W11, W12, and W13.

Each of the weld lines W11, W12, and W13 in the primary molding step P1 is located between the axially thinned portions 3A adjacent to each other in the circumferential direction, as shown in FIG. 9B. In other words, the gates G1

(G11, G12, and G13) are located so that each of the weld lines W11, W12, and W13 is located between the axially thinned portions 3A adjacent to each other in the circumferential direction.

Accordingly, the cross sectional areas of the welds W1 are increased in comparison with a case where the weld lines are located in the axially thinned portions 3A. Thus, the strength of the molded article is prevented from decreasing.

<Primary Molded Article Removal Step>

Figure 6C:
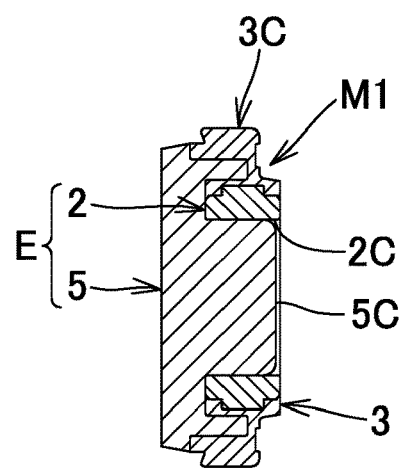

After cooling the primary molding die D1 illustrated in FIG. 6B and hardening the resin, the primary molding die D1 is opened and the insert core 5 and the primary molded article M1, which are illustrated in the perspective view of FIG. 4A and the vertical cross-sectional view of FIG. 6C, are removed from the first injection molding machine. The primary molded article M1 is formed by integrating the annular internal resin member 3 with the metallic core 2.

<Secondary Molding Step>

Figure 7A:
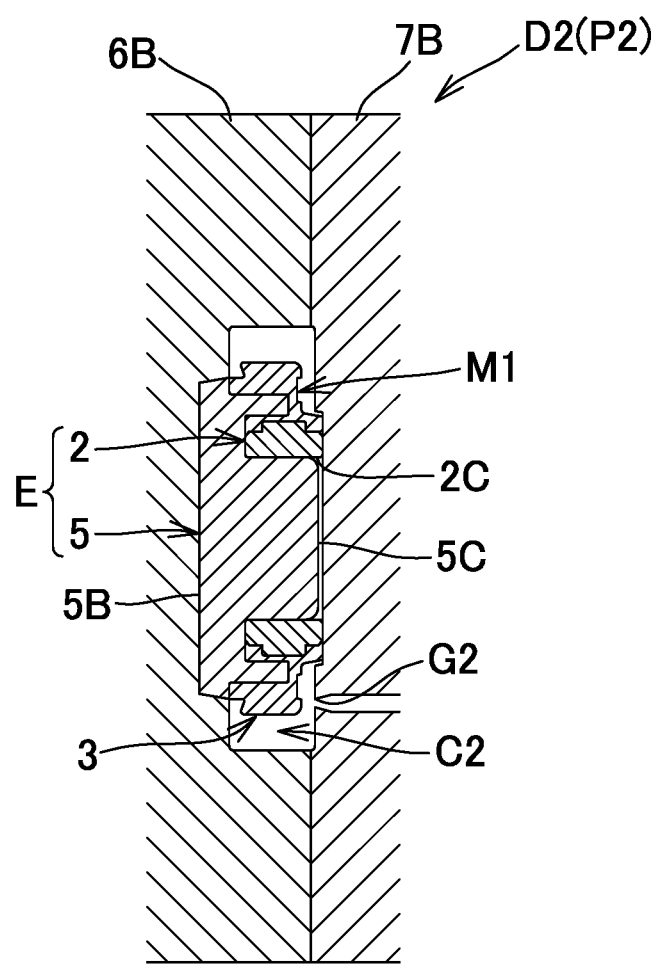
FIGS. 7A to 7C are vertical cross-sectional views, and respectively show: a state in which the primary molded article and the insert core which are illustrated in FIG. 6C are set in the secondary molding die and the secondary molding die is closed; a state in which a secondary-molding molten resin is injected into the secondary molding die; and the secondary molded article and the insert core removed from the opened secondary molding die.
Figure 7B:
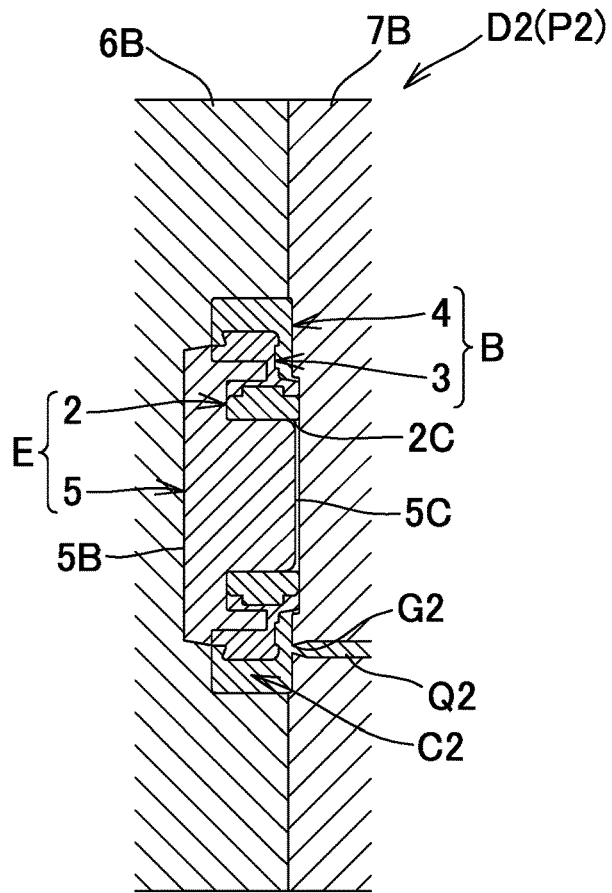

As illustrated in the vertical cross-sectional views of FIGS. 7A and 7B, a secondary molding die D2 includes a movable die 6B and a fixed die 7B, which are used during the secondary molding step P2.

As illustrated in FIG. 7A, the base body 5B of the insert core 5 is positioned in the movable die 6B of the secondary molding die D2 so as to set the insert core 5 and the primary molded article M1 in the secondary molding die D2, and then the secondary molding die D2 is closed.

As illustrated in FIG. 7B, a secondary-molding molten resin Q2 is injected from a gate G2 into a cavity C2 of the secondary molding die D2 to form the annular external resin member 4 by injection molding. The gate G2 is a pin gate, a tunnel gate, or a side gate.

In the case where the gate G2 is a pin gate or others mentioned above, wasted material is reduced to thereby decrease-material cost, in comparison with a case where the gate G2 is a film gate or a disc gate. Furthermore, if the gate is the pin gate or the tunnel gate, the gate is automatically cut at the time when the mold is opened. Accordingly, the gate cut is not required after the molded article is taken out, unlike a case where the gate is the film gate or the disc gate.

The secondary molding step P2 is performed in the state where the axially-projecting convex portions 5A of the insert core 5 are fitted into the axially thinned portions 3A of the primary molded article M1 formed by molding in the primary molding step P1. Accordingly, deformation or a crack occurring on the periphery of the axially thinned portions 3A due to the pressure by the secondary-molding molten resin Q2, which is injected from the gate G2 into the cavity C2 of the secondary molding die D2, can be inhibited by the axially-projecting convex portions 5A of the insert core 5, which are fitted into the axially thinned portions 3A.

<Gate Position in Secondary Molding Step>

In the plan view of FIG. 9A and the bottom view of the FIG. 9B, positions of the gates G2 (gate marks GM 2) used during the secondary molding step P2, and positions of welds W2 at which the secondary-molding molten resin Q2 is joined are illustrated. Three gates G2 are used in the present embodiment. The positions of the gates G2 (gate marks GM2) are indicated by G21, G22, and G23. The weld lines which are the positions of the welds W2 are indicated by W21, W22, and W23.

Each of the weld lines W21, W22, and W23 is located in the radially outside of the rib portions 3B each of which is provided between the axially thinned portions 3A adjacent to each other in the circumferential direction, as shown in FIG. 9B. In other words, the gates G2 (G21, G22, G23) are located so that each of the weld lines W21, W22, and W23 is located in the radially outside of the rib portions 3B each of which is provided between the axially thinned portions 3A adjacent to each other in the circumferential direction.

Accordingly, the welds W2 to which pressure larger than that applied to other portions is applied during pressure keeping after the injection of the secondary-molding molten resin Q2 are not located in the radially outside of the axially thinned portions 3A (the axially-projecting convex portions 5A of the insert core 5). With this configuration, the shearing force and the bending moment which act on the axially-projecting convex portions 5A having a cantilevered shape can be reduced, thereby inhibiting the breakage or fracture of the axially-projecting convex portions 5A. Therefore, the life of the die can be improved.

As in the example illustrated in the plan view of FIG. 9A and the bottom view of FIG. 9B, the number of the gates G1 used in the primary molding step P1 and the number of the gates G2 used in the secondary molding step P2 are set to be plural and the same. In addition, the gates G1 used in the primary molding step P1 and the gates G2 used in the secondary molding step P2 are aligned in the circumferential direction of the molded article, and the gates G2 (G21, G22, G23) used in the secondary molding step P2 are positioned at the middle, or in the vicinity thereof, in the circumferential direction, of the gate marks GM1 (positions corresponding to G11, G12, and G13) of the gates G1 of the annular internal resin member 3 molded in the primary molding step P1 and the weld lines W11, W12, and W13 each of which is adjacent to the corresponding one of the gate marks GM 1.

With this configuration, each of the welds 2 (weld lines W21, W22, W23) of the secondary molded article M2 is generated in the vicinity of the circumferentially middle portion between each gate G1 (G11, G12, G13) of the primary molded article M1 and each weld W1 (weld lines W11, W12, W13).

Accordingly, in the molded article A including the annular resin member B manufactured through the primary molding step P1 and the secondary molding step P2, the radially-extending weld lines W11, W12, W13 formed in the primary molding step P1 never overlap the radially-extending weld lines W21, W22, W23 formed in the secondary molding step P2 or never exist in the vicinity thereof. Thus, the strength of the molded article A including the annular resin member B that is the secondary molded article M2 can be prevented from deteriorating.

<Secondary Molded Article Removal Step>

Figure 7C:
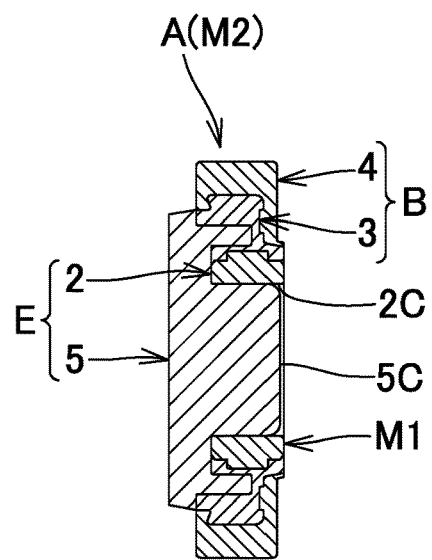

After cooling the secondary molding die D2 illustrated in FIG. 7B and hardening the resin, the secondary molding die D2 is opened and the insert core 5 and the secondary molded article M2 illustrated in the perspective view of FIG. 4B and the vertical cross-sectional view of FIG. 7C are removed from the second injection molding machine. The secondary molded article M2 is formed by integrating the annular external resin member 4 with the primary molded article M1.

<Separation Step>

In the state where the insert core 5 and the secondary molded article M2 are coupled together as illustrated in the vertical cross-sectional view of FIG. 7C, the insert core 5 and the secondary molded article M2 are relatively moved in the axial direction to release the fitting of the round shaft 5C of the insert core 5 with the internal hole 2C of the metallic core 2 of the secondary molded article M2.

Figure 8:
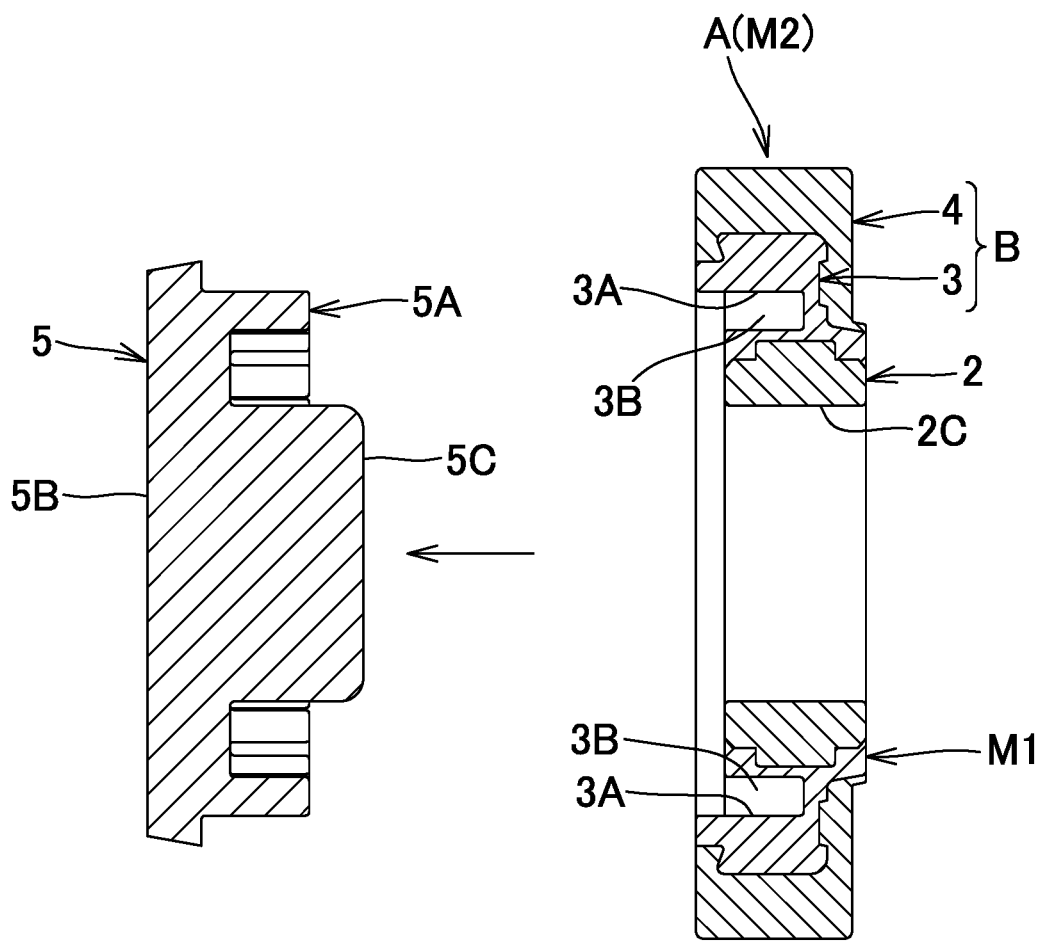
FIG. 8 is a vertical cross-sectional view of the state in which the secondary molded article and the insert core which are illustrated in FIG. 7C are separated from each other.

Accordingly, as illustrated in the vertical cross-sectional view of FIG. 8, the insert core 5 and the molded article A including the annular resin member B as the secondary molded article M2 are separated from each other. The thus separated insert core 5 is reused at the coupling step described above.

In the aforementioned manufacturing method of the molded article A including the annular resin member B, a two-color molding machine as a special molding machine is not used but the first injection molding machine including the primary molding die D1 and the second injection molding machine including the secondary molding die D2 are used for injection molding of the annular resin member B (the annular internal resin member 3 and the annular external resin member 4) that is a resin part usually requiring the injection molding twice. The molding machines that are not special machines are used, thereby inhibiting increase in introduction cost, and providing high versatility. Therefore, dies can be easily fabricated.

According to the manufacturing method of the molded article A including the annular resin member B as described above, the coupled body E formed by concave-convex fitting the insert core 5 into the metallic core 2 made of metal so as to be coupled together is used in common at the primary molding step P1 using the primary molding die D1 of the first injection molding machine and at the secondary molding step P2 using the secondary molding die D2 of the second injection molding machine. Accordingly, it is possible to inhibit the deformation, under influence of mold shrinkage and the like, of the primary molded article M1 removed from the first injection molding machine after the primary molding step P1.

In addition, since the base body 5B of the insert core 5 used in common at the primary molding step P1 and the secondary molding step P2 is positioned in the primary molding die D1 and the secondary molding die D2, the positioning of the metallic core 2 in the primary molding die D1 and the positioning of the primary molded article M1 in the secondary molding die D2 become easy and reliable.

Accordingly, in the manufacture of the molded article A including the annular resin member B formed by performing injection molding twice on the resin part, it is possible to easily fabricate the dies without using a special molding machine and to inhibit the deformation of the primary molded article M1 due to the influence of mold shrinkage and the like. Therefore, it is possible to stabilize mass-production quality and improve yield while preventing manufacturing costs from increasing.

Further, it is easy to provide axially thinned portions 3A in the annular internal resin member 3 as illustrated in FIG. 8, by the axially-projecting convex portions 5A in the insert core 5 (see FIGS. 3C and 5B).

Moreover, the axially-projecting convex portions 5A of the insert core 5 are inserted in the axially thinned portions 3A formed in the annular internal resin member 3 in the primary molding step P1, and the axially-projecting convex portions 5A remain in the axially thinned portions 3A after the secondary molding step P2 until the separation step is carried out.

Accordingly, it is possible to inhibit the deformation, due to mold shrinkage or the like, of the axially thinned portions 3A in the primary molded article M1 removed from the first injection molding machine after the primary molding step P1.

<Test for Checking Damage of Axially-Projecting Convex Portions in Insert Core>

The insert core 5 as illustrated in the perspective view of FIG. 3B is prepared using a typical material for a die, and the injection molding through the primary molding step P1 and the secondary molding step P2 are performed 5000 shots. Then, occurrence of damage of to the axially-projecting convex portions 5A in the insert core 5 is checked.

Examples and Comparative Examples

In Example of the present invention, the welds W2 in the secondary molding step P2 are positioned in the radially outside of the rib portions 3B of the primary molded article M1, and the ratio (H/F) of a height H of the axially-projecting convex portions 5A with respect to a thickness F, in the radial direction, of the axially-projecting convex portion 5A, which is shown in FIG. 3B, is set to 2.

In Comparative Example 1, the welds W2 in the secondary molding step P2 are positioned in the radially outside of the axially thinned portions 3A of the primary molded article M1, and the ratio H/F is set to 1.

In Comparative Example 2, the welds W2 in the secondary molding step P2 are positioned in the radially outside of the axially thinned portions 3A of the primary molded article M1, and the ratio H/F is set to 2.

TABLE 1

| Example/ Comparative Example | Position of welds W2 in secondary molding step P2 | Axially-projecting convex portion 5A of insert core 5 (Height H)/ (Radial-direction thickness F) | Breakage of axially-projecting convex portion 5A of insert core 5 |
| --- | --- | --- | --- |
| Example | Radially outside of rib portion 3B of primary molded article M1 | 2 | None |
| Comparative Example 1 | Radially outside of thinned portion 3A of primary molded article M1 | 1 | None |
| Comparative Example 2 | Radially outside of thinned portion 3A of primary molded article M1 | 2 | Breakage at position of weld W2 in secondary molding step P2 |

<Test Result>

In Comparative Example 1 (the welds W2 in the secondary molding step P2 are positioned in the radially outside of the axially thinned portions 3A of the primary molded article M1, and H/F=1), the welds W2 in the secondary molding step P2 are positioned in the radially outside of the axially thinned portions 3A of the primary molded article M1. Even in such a configuration, no breakage was found in the axially-projecting convex portions 5A of the insert core 5.

In Comparative Example 2 (the welds W2 in the secondary molding step P2 are positioned in the radially outside of the axially thinned portions 3A of the primary molded article M1, and H/F=2), breakage was found in the axially-projecting convex portions 5A of the insert core 5 at positions of the welds W2 in the secondary molding step P2.

In contrast, in Example (the welds W2 in the secondary molding step P2 are positioned in the radially outside of the rib portions 3B of the primary molded article M1, and H/F=2), no breakage was found in the axially-projecting convex portions 5A of the insert core 5.

In the present invention, the gates G2 are located so that the welds W2 are positioned in the radially outside of each rib portion 3B between the axially thinned portions 3A adjacent to each other, and thus the welds W2 to which pressure larger than that applied to other portions is applied during pressure keeping after the filling of the secondary-molding molten resin Q2 are not located in the radially outside of the axially thinned portions 3A (the axially-projecting convex portions 5A of the insert core 5). In view of the test results and the configuration of the present invention as mentioned above, the present invention is particularly effective when the ratio (H/F) of the height H of the axially-projecting convex portion 5A with respect to its thickness F in the radial direction, which is shown in FIG. 3B, is 2 or more (H/F≥2).

Although, in the aforementioned description, the configuration that uses two general molding machines including the first injection molding machine with the primary molding die D1 and the second injection molding machine with the secondary molding die D2 is described, the present invention is not limited to this configuration. In other words, when the production amount is low, a single injection molding machine may be used to perform both the primary molding step P1 using the primary molding die D1 and the secondary molding step P2 using the secondary molding die D2, with changing the dies and resin materials.

Although an example using the insert core 5 in the secondary molding step P2 is described in the above description, the insert core 5 may not be used in the secondary molding step P2 in another example.

For example, when batch processing is performed, in which the secondary molded article M2 is formed by molding in the number corresponding to a single lot after the primary molding step P1 is performed to form the primary molded articles M1 by molding in the number corresponding to a single lot, the primary molding step P1 and the secondary molding step P2 are not successively performed. Thus, the insert core 5 is not used in the secondary molding step P2. In other words, the insert core 5 is removed from the coupled body E and the annular internal resin member 3, which have undergone the primary molding step P1, and the insert core 5 is used in the next primary molding step P1.

In the secondary molding step P2, the secondary molding die D2 is used for the metal member 2 and the annular internal resin member 3, which are prepared by removing the insert core 5 from the coupled body E and the annular internal resin member 3 which have undergone the primary molding step P1. The secondary molding die D2 has a shape of the round shaft 5C that is the fitting projection, and the axially-projecting convex portions to be fitted into the axially thinned portions 3A of the annular internal resin member 3. The metal member 2 and the annular internal resin member 3 are placed in the secondary molding die D2 so that the axially thinned portions 3A of the annular internal resin member 3 are fitted into the axially-projecting convex portions of the secondary molding die D2, and then the injection molding is performed.

Figure 10A:
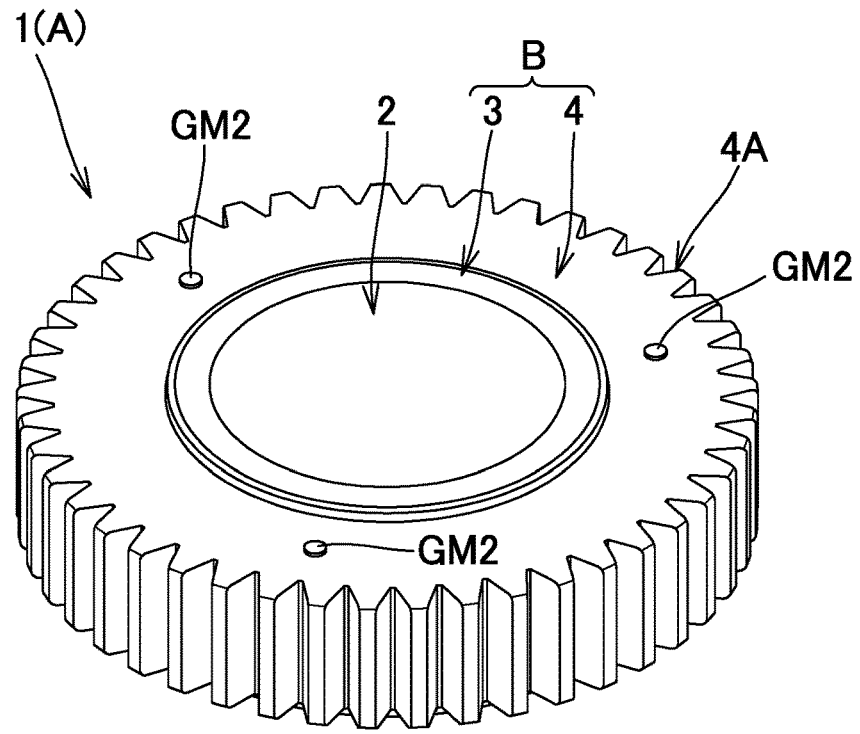
FIG. 10A is a perspective view of a resin gear with metallic core (in the case where the metallic core has a shaft portion) prepared by forming teeth through machining operation at the outer peripheral surface of the molded article manufactured by the manufacturing method of the molded article including the annular resin member according to the embodiment of the present invention.
Figure 10B:
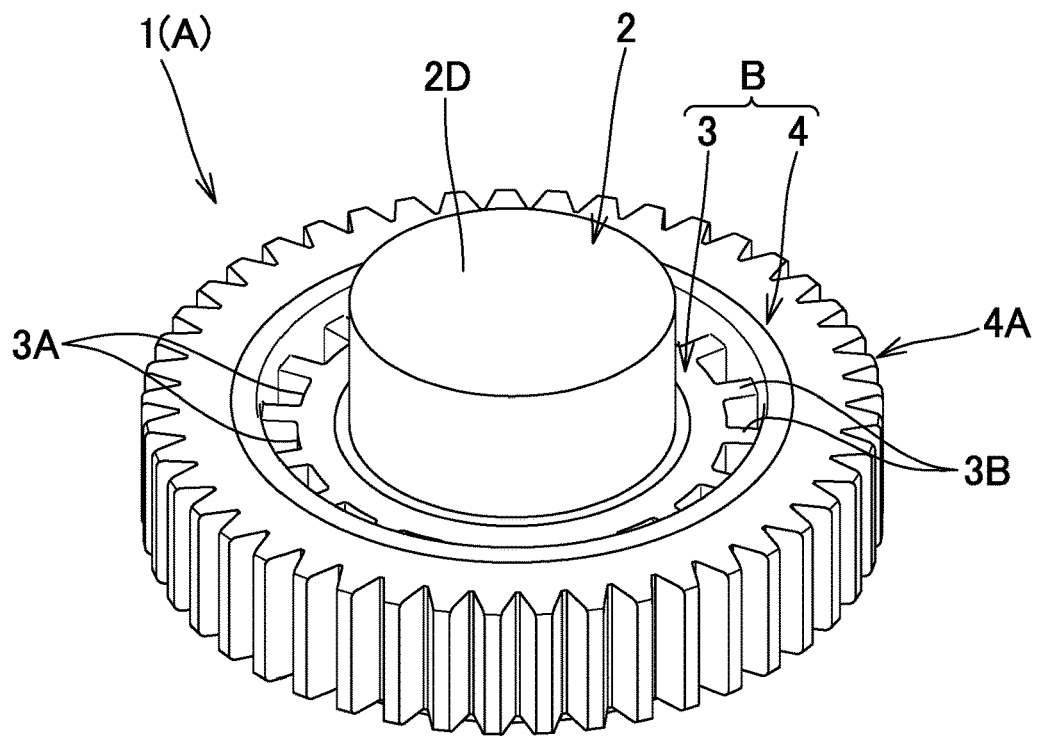
FIG. 10B is a perspective view viewed from the underneath of the resin gear with metallic core shown in FIG. 10A.
Figure 11:
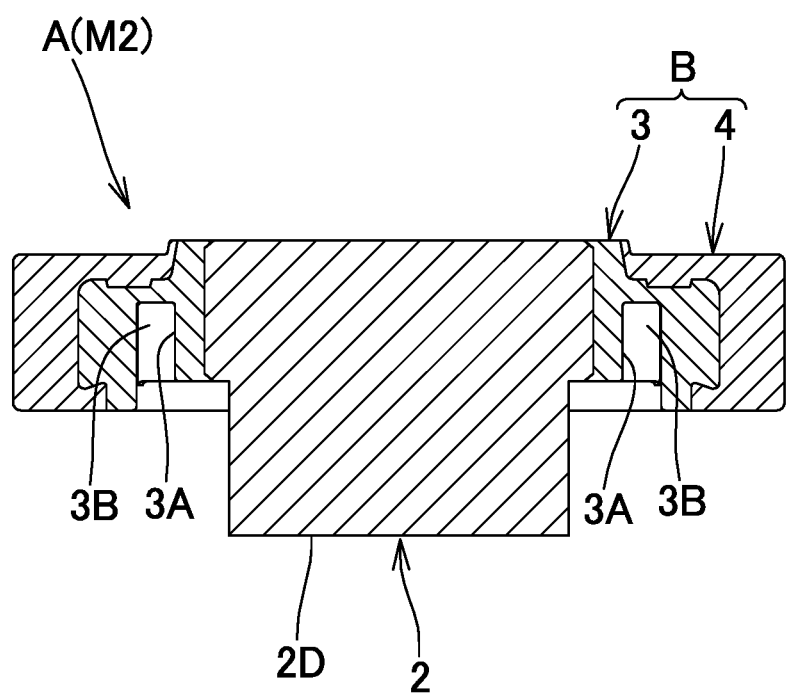
FIG. 11 is a vertical cross-sectional view of the molded article (the resin gear with metallic core before formation of teeth to engage with another gear on its outer peripheral surface) manufactured by the manufacturing method of the molded article including the annular resin member, according to the embodiment of the present invention.

The metallic core 2 that is the metallic member is not limited to an annular sleeve. The metallic core 2 that is the metallic member may have a shaft therein, for example. FIGS. 10A and 10B are perspective views respectively showing an example of the resin gear with metallic core 1 when the metallic core 2 has a shaft portion 2D. FIG. 11 is a vertical cross-sectional view of the molded article A (the resin gear with metallic core before the formation of teeth, on its outer peripheral surface, to engage with another gear) manufactured by the manufacturing method of the molded article A including the annular resin member B, according to the embodiment of the present invention, when the metallic core 2 has the shaft portion 2D.

Figure 12A:
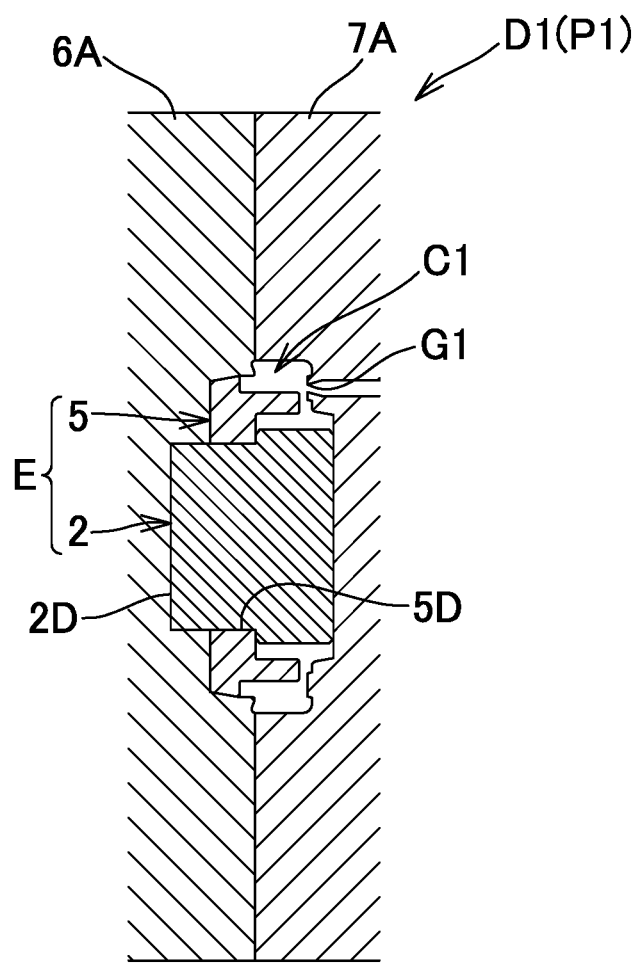
FIGS. 12A to 12C are vertical cross-sectional views, and respectively show: a state where the coupled body, in which the insert core is fitted into the metallic core, is set in the primary molding die and the molding die is closed; a state where the primary-molding molten resin is injected into the primary molding die; and a state where the primary molded article and the insert core, which are removed from the opened primary molding die.
Figure 12B:
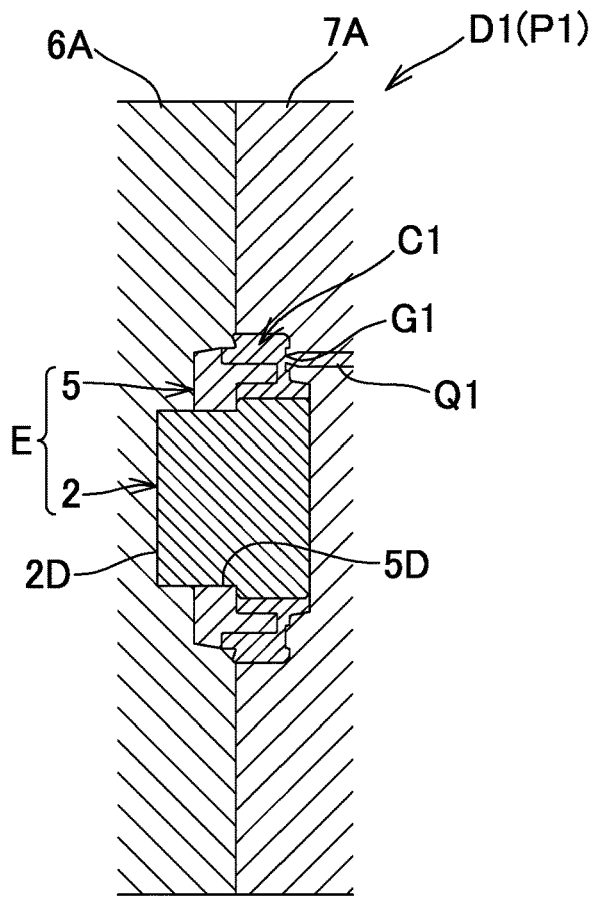
Figure 12C:
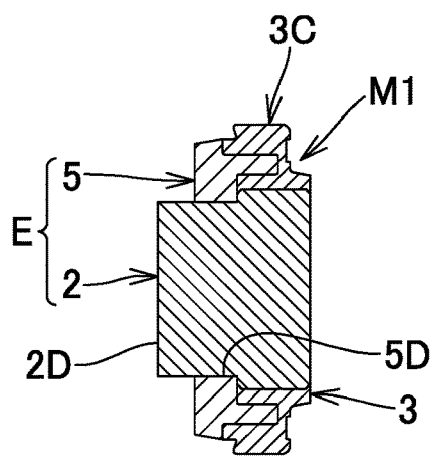
Figure 13A:
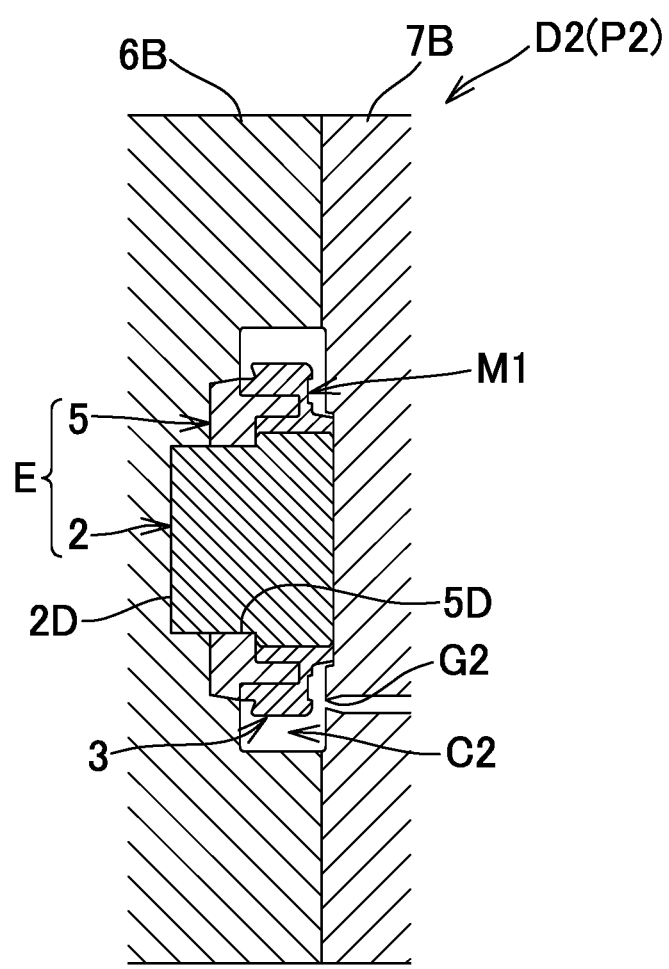
FIGS. 13A to 13C are vertical cross-sectional views, and respectively show: a state where the primary molded article and the insert core, which are illustrated in FIG. 12C, are set in the secondary molding die and the molding die is closed; a state where the secondary-molding molten resin is injected into the secondary molding die; and a state where the secondary molded article and the insert core, which are removed from the opened secondary molding die.
Figure 13B:
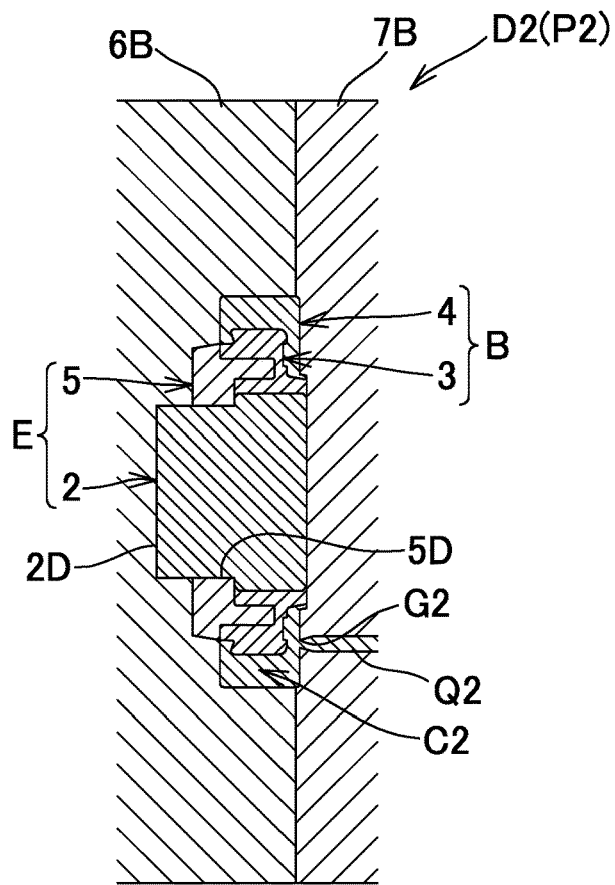
Figure 13C:
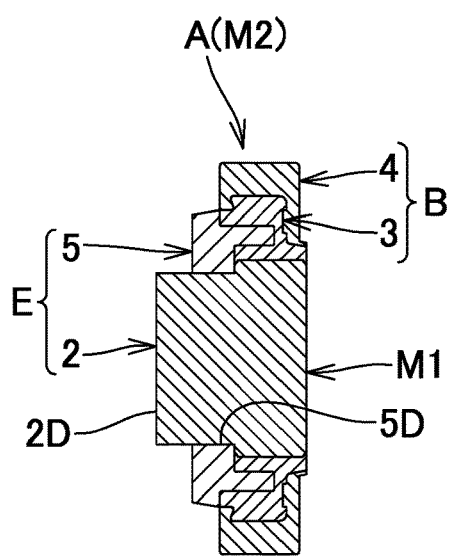

If the metallic core 2 has the shaft portion 2D, the insert core 5 has an internal hole 5D that is a fitting concave portion to be fitted with the shaft portion 2D, as shown in the vertical cross-sectional views of FIG. 12C and FIG. 13C.

FIGS. 12A and 12B, which respectively correspond to FIGS. 6A and 6B, are vertical cross-sectional views showing the primary molding step P1 when the metallic core 2 has the shaft portion 2D. FIG. 12C, which corresponds to FIG. 6C, is a vertical cross-sectional view of the insert core 5 and the primary molded article M1 that are removed from the first injection molding machine by opening the primary molding die D1 during the primary molded article removing step.

FIGS. 13A and 13B, which respectively correspond to FIGS. 7A and 7B, are vertical cross-sectional views showing the secondary molding step P2 when the metallic core 2 has the shaft portion 2D. FIG. 13C, which corresponds to FIG. 7C, is a vertical cross-sectional view of the insert core 5 and the secondary molded article M2 that are removed from the second injection molding machine by opening the secondary molding die D2 during the secondary molded article removing step.

In the present invention, the gate G2 for injecting the secondary-molding molten resin Q2 into the cavity C2 of the secondary molding die D2 is located in the secondary molding die D2 so that the welds W2 that are the joining points of the secondary-molding molten resin Q2 in the secondary molding step P2 are positioned in the radially outside of the rib portions 3B each of which is provided between the axially thinned portions 3A adjacent to each other. Thus, the present invention can be applied to the molded article A including the annular resin member B, even if the molded article A does not have the metallic core 2 that is the metallic member.

If the molded article does not have the metallic core 2 that is the metallic member, and the batch processing, for example, is performed, the insert core 5 is removed from the annular internal resin member 3 and the insert core 5 that have undergone the primary molding step P1 so that only the annular internal resin member 3 remains.

In the secondary molding step P2, the secondary molding die D2 having the axially-projecting convex portions to be fitted with the axially thinned portions 3A of the annular internal resin member 3 is used, and the injection molding is performed with locating the annular internal resin member 3 in the secondary molding die D2 so that the axially thinned portions 3A of the annular internal resin member 3 are fitted with the axially-projecting convex portions of the secondary molding die D2.

The above description of the embodiments are all examples, and thus the present invention is not limited thereto. Various improvements and modifications without departing from the scope of the present invention can be applied thereto.

REFERENCE NUMERALS

1 . . . Resin gear with metallic core
2 . . . Metallic core (metallic member)
2A . . . Teeth-shaped projection
2B . . . Base body
2C . . . Internal hole (fitting concave portion)
2D . . . Shaft potion
3 . . . Annular internal resin member
3A . . . Axially thinned portion
3B . . . Rib portion
3C . . . Teeth projection
4 . . . Annular external resin member
4A . . . Teeth
5 . . . Insert core
5A . . . Axially-projecting convex portions
5B . . . Base body
5C . . . Round shaft (fitting convex portion)
5D . . . Internal hole (fitting concave portion)

6A, 6B . . . Movable die
7A, 7B . . . Fixed die
A . . . Molded article including annular resin member
B . . . Annular resin member
C1, C2 . . . Cavity
D1 . . . Primary molding die
D2 . . . Secondary molding die
E . . . Coupled body
F . . . Thickness of axially-projecting convex portions in radial direction
G11, G2 . . . Gate
G11, G12, G13, G21, G22, G23 . . . Gate position
G1, G2 . . . Gate mark
H . . . Height of the axially-projecting convex portion
M1 . . . Primary molded article
M2 . . . Secondary molded article
P1 . . . Primary molding step
P2 . . . Secondary molding step
Q1 . . . Primary molding molten resin
Q2 . . . Secondary molding molten resin
W1, W2 . . . Weld
W11, W12, W13, W21, W22, W23 . . . Weld line

The invention claimed is:

1. A manufacturing method of a molded article including an annular resin member,
the molded article including:
an annular internal resin member formed by molding in a primary molding step using a primary molding die to have a plurality of axially thinned portions that are to be apart from one another in a circumferential direction; and
an annular external resin member formed by molding in a secondary molding step using a secondary molding die, the annular external resin member covering an outer periphery of the annular internal resin member and being made of a material different from a material of the annular internal resin member,
the manufacturing method comprising:
using one of a pin gate, a tunnel gate, and a side gate for a gate used for injecting a primary-molding molten resin in a cavity of the primary molding die and a gate used for injecting a secondary-molding molten resin in a cavity of the secondary molding die;
in the primary molding step,
using an insert core having a plurality of axially-projecting convex portions aligned apart from one another in the circumferential direction for forming the axially thinned portions in the annular internal resin member, and
locating the insert core in the primary molding die, and performing injection molding,
in the secondary molding step,
performing injection molding by one of:
(i) locating the annular internal resin member and the insert core which have undergone the primary molding step in the secondary molding die; and
(ii) removing the insert core from the annular internal resin member and the insert core which have undergone the primary molding step to allow only the annular internal resin member to remain,
using the secondary molding die having axially-projecting convex portions to be fitted in the axially thinned portions of the annular internal resin member, and
locating the annular internal resin member in the secondary molding die so that the axially thinned portions of the annular internal resin member are fitted in the axially-projecting convex portions of the secondary molding die; and
locating, in the secondary molding die, the gate used for injecting the secondary-molding molten resin in the cavity of the secondary molding die so that a weld that is a joining point of the secondary-molding molten resin in the secondary molding step is positioned in radially outside of a rib portion between the axially thinned portions adjacent to each other.

2. The manufacturing method of a molded article including an annular resin member, according to claim 1, wherein the gate used for injecting the primary-molding molten resin is located in the primary molding die so that the weld that is a joining point of the primary-molding molten resin in the primary molding step is positioned between the axially thinned portions adjacent to each other.

3. The manufacturing method of a molded article including an annular resin member, according to claim 2, wherein
the number of the gate in the primary molding step and the number of the gate in the secondary molding step are set to be plural and identical, and the gates used in the primary molding step and the gates used in the secondary molding step are arranged in the circumferential direction, and
each of the gates in the secondary molding step is positioned in a circumferentially middle, or in vicinity thereof, of a gate mark in the annular internal resin member formed by molding in the primary molding step and a weld line adjacent to the gate mark.

4. A manufacturing method of a molded article including an annular resin member,
the molded article including:
a metallic member that is an insert article,
an annular internal resin member formed by molding in a primary molding step using a primary molding die to have a plurality of axially thinned portions that are apart from one another in a circumferential direction, the annular internal resin member covering an outer periphery of the metallic member; and
an annular external resin member formed by molding in a secondary molding step using a secondary molding die, the annular external resin member covering an outer periphery of the annular internal resin member and being made of a material different from a material of the annular internal resin member,
the manufacturing method comprising:
using one of a pin gate, a tunnel gate, and a side gate for a gate used for injecting a primary-molding molten resin in a cavity of the primary molding die and a gate used for injecting the secondary-molding molten resin in a cavity of the secondary molding die;
in the primary molding step,
using an insert core having a plurality of axially-projecting convex portions that are apart from one another in a circumferential direction for forming the axially thinned portions in the annular internal resin member, and
locating, in the primary molding die, a coupled body in which the insert core is fitted in the metallic member, and performing injection molding,
in the secondary molding step,
performing injection molding by one of:

(i) locating the coupled body and the annular internal resin member which have undergone the primary molding step in the secondary molding die; and (ii) removing the insert core from the coupled body and the annular internal resin member which have undergone the primary molding step to allow only the metallic member and the annular internal resin member to remain, using the secondary molding die having axially-projecting convex portions to be fitted in the axially thinned portions of the annular internal resin member, and locating the metallic member and the annular internal resin member in the secondary molding die so that the axially thinned portions of the annular internal resin member are fitted in the axially-projecting convex portions of the secondary molding die; and locating the gate used for injecting the secondary-molding molten resin in the cavity of the secondary molding die in the secondary molding die so that a weld that is a joining point of the secondary-molding molten resin in the secondary molding step is positioned in radially outside of a rib portion between the axially thinned portions adjacent to each other.

5. The manufacturing method of a molded article including an annular resin member, according to claim 4, wherein the gate used for injecting the primary-molding molten resin is located in the primary molding die so that the weld that is a joining point of the primary-molding molten resin in the primary molding step is positioned between the axially thinned portions adjacent to each other.

6. The manufacturing method of a molded article including an annular resin member, according to claim 5, wherein the number of the gate in the primary molding step and the number of the gate in the secondary molding step are set to be plural and identical, and the gates used in the primary molding step and the gates used in the secondary molding step are arranged in the circumferential direction, and each of the gates in the secondary molding step is positioned in a circumferentially middle, or in vicinity thereof a gate mark in the annular internal resin member formed by molding in the primary molding step and a weld line adjacent to the gate mark.

* * * * *